(12) United States Patent
Moulsley

(10) Patent No.: US 6,515,609 B1
(45) Date of Patent: Feb. 4, 2003

(54) RADIO RECEIVER

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/521,715

(22) Filed: Mar. 9, 2000

(30) Foreign Application Priority Data

Mar. 16, 1999 (GB) ............................................. 9905997

(51) Int. Cl.$^7$ ................................................ H03M 1/12
(52) U.S. Cl. ...................................... 341/155; 348/724
(58) Field of Search ................................. 341/155, 164, 341/162, 161, 123; 348/555, 558, 426

(56) References Cited

U.S. PATENT DOCUMENTS 4,910,752 A * 3/1990 Yester, Jr. et al. ............ 375/75
5,550,544 A    8/1996 Sakiyama ..................... 341/155
5,625,359 A * 4/1997 Wilson et al. ............... 341/143
5,886,988 A * 3/1999 Yun et al. ..................... 370/329
6,219,108 B1 * 4/2001 Leroy .......................... 348/724
6,219,559 B1 * 4/2001 Hill et al. .................... 455/522

* cited by examiner

Primary Examiner—Peguy JeanPierre
Assistant Examiner—Joseph Lauture
(74) Attorney, Agent, or Firm—Jack D. Slobod

(57) ABSTRACT

A radio receiver comprises frequency translation means(20, 21, 22) for frequency down converting an input signal to an intermediate signal, digital channel selection filtering means including at least one analogue-to-digital converter(ADC) (32, 33), the ADC comprising an over-sampling quantizer (Q1, Q2) having a plurality of dynamically selectable quantization levels, and means(30, 31, 36) responsive to the characteristics of the input signal for adjusting the resolution of the ADC to the characteristics of the input signal. The ADC may comprise a Sigma-Delta ADC. The resolution may be adjusted by altering the over-sampling rate and/or selecting the number of quantization levels to handle the prevailing interference and the wanted signal.

Figure 1:
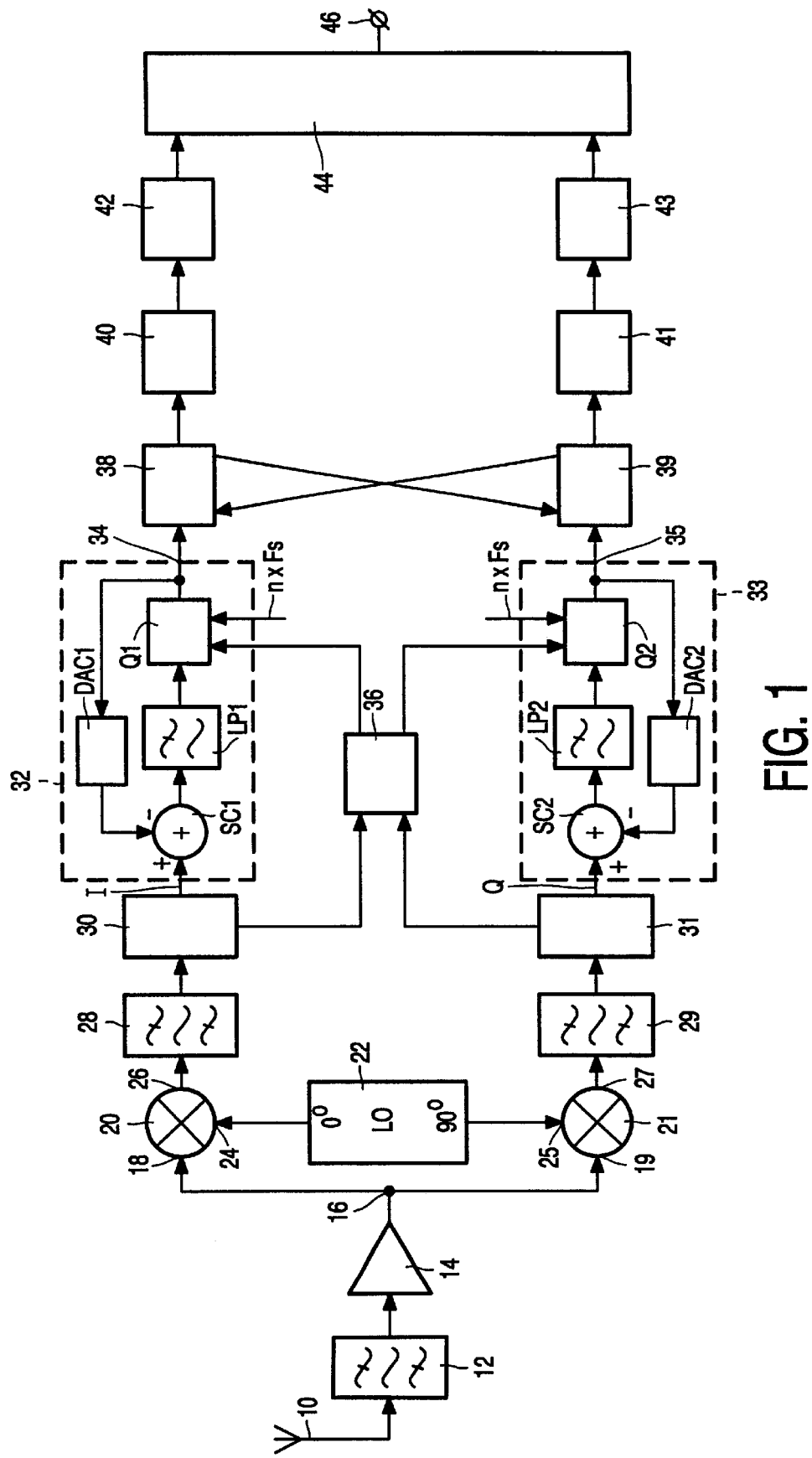

10 Claims, 3 Drawing Sheets

RADIO RECEIVER

The present invention relates to a radio receiver (or a receiving section of a transceiver), to an integrated circuit embodying those elements of the receiver which are integratable and to a method of operating a radio receiver to reduce power consumption.

In current mobile radio receivers, such as those used for operating in accordance with cellular telephone standards, for example GSM, channel selection is usually carried out using analogue filters, but increasingly digital implementation is being sought to reduce cost and improve flexibility. In principle a relatively wide part of the spectrum containing the wanted signal can be selected by analogue filters, and the final channel detection then performed using DSP techniques. However, the ADC converter must operate at a sufficiently high sampling rate to allow processing of the whole of the band of interest, and the dynamic range must be sufficient for the worst case condition. This occurs where the wanted signal is weak, but the adjacent channel interferers are strong. The power consumption of the ADC is a major problem in this approach, and can be prohibitive. It has been proposed that the power consumption can be reduced using Sigma-Delta converters where adjacent channels can be partly rejected using the decimation filters.

It is an object of the present invention to reduce further the power consumption of a radio receiver, especially a battery powered receiver.

According to a first aspect of the present invention there is provided a receiver comprising at least one analogue-to-digital converter (ADC), means for determining the level of at least the prevailing adjacent channel interference, and means for dynamically adjusting the resolution of the ADC to be no larger than that required to handle the prevailing interference and the wanted signal.

According to a second aspect of the present invention there is provided a receiver comprising means to frequency down convert an input signal to an intermediate signal, digital channel selection filtering means including at least one analogue-to-digital converter(ADC), said ADC comprising an over-sampling quantizer having a plurality of dynamically selectable quantization levels, and means responsive to the characteristics of the input signal for varying the over-sampling rate and/or matching the number of quantization levels selected to the characteristics of the input signal.

The second aspect of the present invention provides a receiver comprising means to frequency down convert an input signal to an intermediate signal, digital channel selection filtering means including at least one analogue-to-digital converter(ADC), said ADC comprising a signal combiner having first and second inputs and an output, the intermediate frequency signal being coupled to the first input, analogue filtering means coupled to said output, an over-sampling quantizer coupled to an output of the analogue filtering means, the over-sampling quantizer having an output which is coupled to digital filtering means which provides an output signal, a digital to analogue converter having an input coupled to the output of the over-sampling quantizer and an output coupled to the second input of the signal combiner which produces the difference between the signals on its first and second inputs as an output, wherein the over-sampling quantizer has a plurality of dynamically selectable quantization levels, and means responsive to the characteristics of the input signal are provided for varying the over-sampling rate and/or matching the number of quantization levels selected to the characteristics of the input signal.

In an embodiment of the present invention the intermediate frequency may be a zero IF or a low IF corresponding to say half the channel bandwidth.

According to a third aspect of the present invention there is provided a method of operating a receiver having at least one analogue to digital converter(ADC), comprising determining the level of prevailing interference and dynamically adjusting the resolution of the ADC to be no larger than that required to handle the prevailing interference and the wanted signal.

According to a fourth aspect of the present invention there is provided an integrated circuit comprising at least one analogue-to-digital converter(ADC), said ADC comprising an over-sampling quantizer having a plurality of dynamically selectable quantization levels, and means responsive to the characteristics of an input signal to the ADC for varying the over-sampling rate and/or matching the number of quantization levels selected to the characteristics of the input signal.

The present invention is based on the principle that the average power consumption of the ADC can be reduced by dynamically adjusting the resolution of the ADC such that it is no larger than is required to handle the prevailing interference and recover the wanted signal after processing. Typically, adjacent channels are of similar amplitude to the wanted signal. In such a case the required resolution may be small, for example 8 bits. In the worst case a much larger dynamic range may be needed, for example 14 bits, leading to an increase in the power consumption.

The ADC may comprise a Sigma-Delta ADC.

U.S. Pat. No. 5,550,544 discloses a first order Delta-Sigma ADC in which an input signal is compared with each of a plurality of preset (n−1) reference levels and is quantized into one of n-digital output signals. Thus when the amplitude of an input signal is small, the amplitude of a difference signal between the input signal entered into the quantizer and an output signal therefrom, that is the quantization noise, is small.

By the receiver in accordance with the present invention being able to control the number of quantization levels relative to the dynamic range of an input signal, fewer comparisons have to be made in the case of smaller amplitude signals thus saving current compared to the solution taught in U.S. Pat. No. 5,550,544.

In an embodiment of the present invention means are provided for estimating the required characteristics, such as dynamic range. These means may comprise filters before or within the ADC structure to measure directly the energies in the wanted and unwanted bands.

Figure 2:
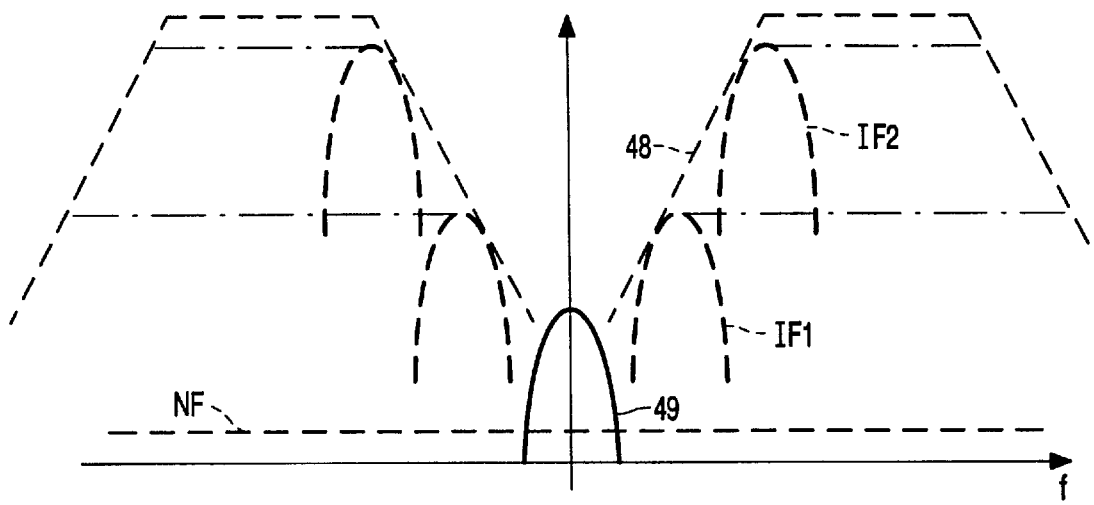
Figure 4:
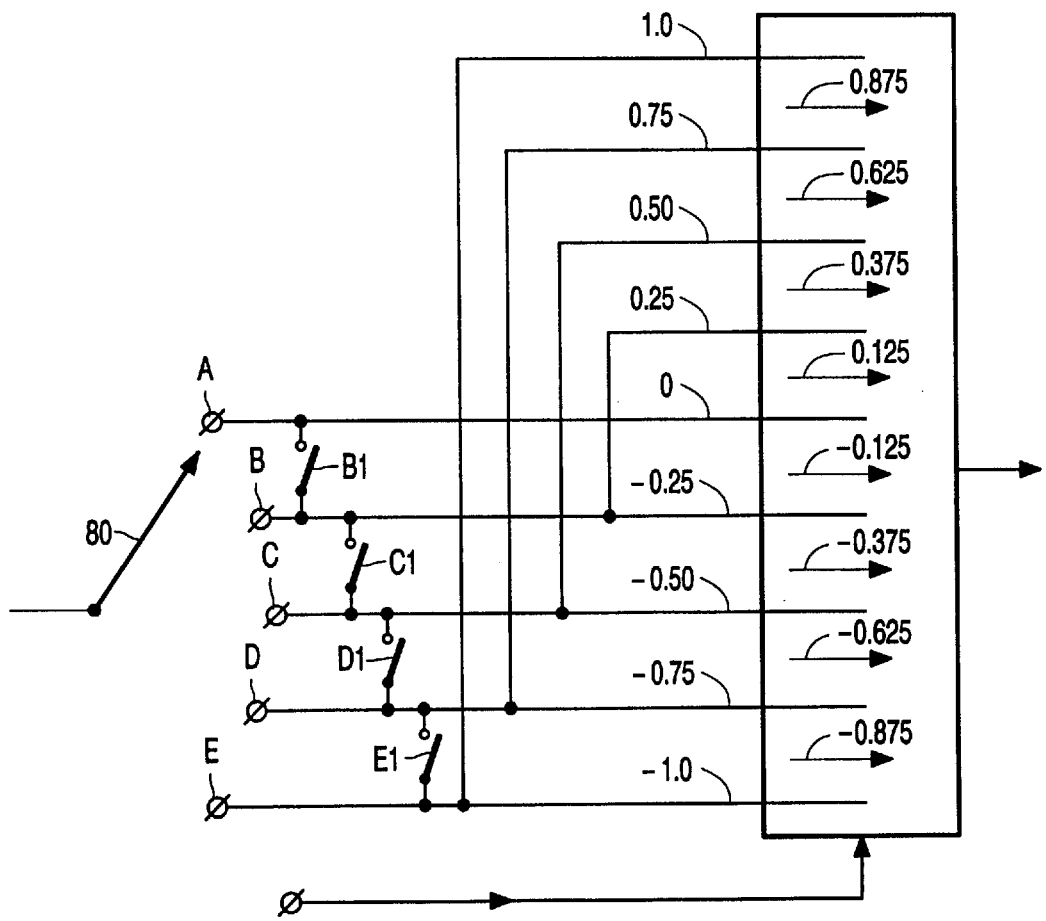
Figure 3:
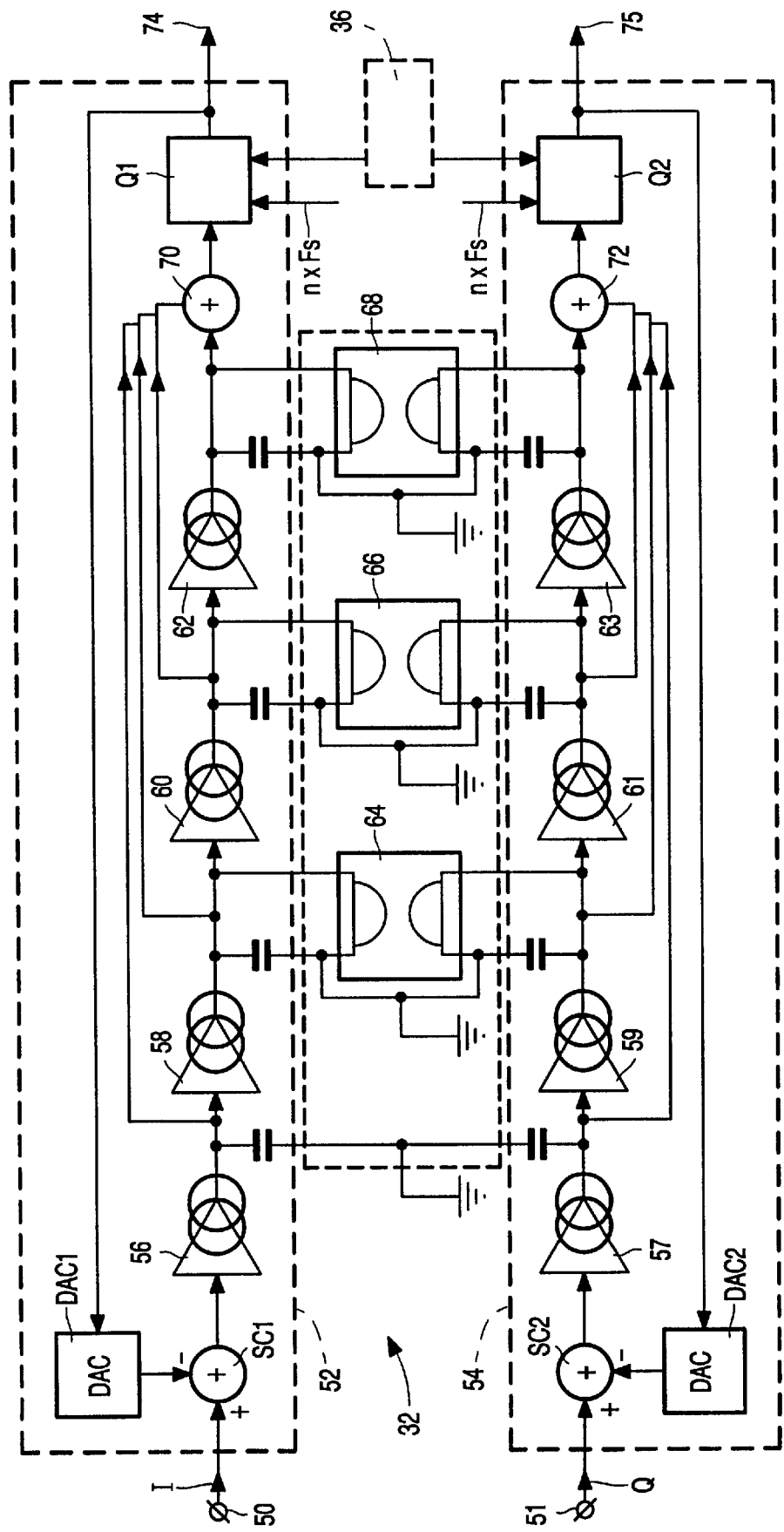

The present invention will now be described, by way of example, with reference to the accompanying drawings, wherein:

FIG. 1 is a general block schematic diagram of a quadrature receiver operating at a low IF, FIG. 2 is a zero IF example of a frequency (f) versus amplitude diagram illustrating the area of operation of the ADC, FIG. 3 is a block schematic diagram of a cross coupled, continuous time fourth order, low pass Sigma-Delta ADC, and FIG. 4 illustrates diagrammatically the quantizer having dynamically selectable quantization levels.

In the drawings, the same reference numerals have been used to indicate corresponding features.

For convenience of description the present invention will be described with reference to the GSM (Global System for Mobile Communications) digital cellular telephone standard.

Referring to FIG. 1, the receiver (or receiver section) comprises an antenna 10 coupled to a low noise RF amplifier 14 by way of a bandpass filter 12 which selects signals in the GSM band of 925 to 960 MHz. The signal from the amplifier 14 is split at a node 16 and supplied to first inputs 18, 19 of balanced mixers 20, 21. Quadrature related local oscillator signals having a frequency offset by 100 kHz (or half a channel) from the centre frequency of the received signal are supplied by a signal generator 22 to second inputs 24, 25 of the mixers 20, 21. Real and imaginary low IF outputs 26, 27 of the mixers 20, 21, respectively, are supplied to cross-coupled, continuous time, fourth order low pass Sigma-Delta converters 32, 33 by way of bandpass filters 28, 29 and interference measuring stages 30, 32. If it is desired to apply a measure of automatic gain control this may be applied to outputs of the filters 28, 29. The input signals to the Sigma-Delta converters 32, 33 are, 30 respectively, in-phase (I) and quadrature (Q) IF signals at 100 kHz. Each converter 32, 33 comprises in the present embodiment low pass filters LP1 and LP2, the outputs of which are applied to an over-sampled quantiser Q1, Q2. An output from the respective quantiser Q1, Q2 is converted back to an analogue signal by respective digital to analogue converters (DAC) DAC1, DAC2 and is subtracted from the input signals in signal combiners SC1, SC2, respectively.

The described arrangement provides a noise shaping characteristic which significantly reduces the quantisation noise at the channel frequency of interest.

The quantisers Q1, Q2 have a variable resolution which can be preselected as a result of measurements of the prevailing signal characteristics, for example interference, by the stages 30, 31. Outputs from the stages 30, 31 are applied to a controller 36 which controls the resolution of the quantisers Q1, Q2.

Outputs 34, 35 from the converters 32, 33 are applied to first decimation stages 38, 39 which provide anti-alias bandpass filtering and a reduction in the sampling rate by, in the present embodiment, a factor of 6. The outputs from the first decimation stages 38, 39 are at 2.17 MHz. The signals from the first decimation stages 38, 39 are derotated in derotation stages 40, 41. Second decimating stages 42, 43 are coupled to the derotation stages 40, 41 respectively, and reduce the sampling rate by, in this embodiment, a factor of 8 to provide signals at 270.83 kHz, the bit rate of GSM. Outputs from the second decimating stages 42, 43 are supplied to an equaliser/demodulator stage 44 which provides an output 46.

The operation of the receiver shown in FIG. 1 may be summarised by the incoming RF signal from the antenna 10 being converted in the balanced mixers 20, 21 into in-phase (I) and quadrature (Q) components at a low IF equal to typically half the channel bandwidth or half the channel spacing. These I and Q signals are digitised using a pair of low-pass Sigma-Delta converters 32, 33 which have been cross-coupled in order to shift the noise shaping minimum from zero to the low IF in use. The bitstream output from the Sigma-Delta converters 32, 33 is then decimated and derotated to provide a multi-bit digitised zero—IF output, the majority of the adjacent channel filtering having been done in the decimation process. The multi-bit output is then demodulated as appropriate for the application.

FIG. 2 shows by way of example the noise shaping characteristic 48 is disposed symmetrically about a zero IF channel 49 of interest. The noise floor NF is indicated by the horizontal broken line. The relatively high amplitude of the noise shaping characteristic 48 is to enable the converters 32, 33 to handle large amplitude adjacent channel interferers which in practice may not be present. If the converters 32, 33 are operated on the basis of always providing a high dynamic range, the power consumption of the converters 32, 33 will be high.

As shown, the adjacent channel interferers IF1 and IF2 may have a range of amplitudes which are not at the maximum. Accordingly by adjusting the noise shaping characteristic dynamically in accordance with the wanted signal or the amplitude of adjacent channel interferers (if greater), for example as shown in the chain-dot lines, power can be saved.

In FIG. 1 the measurement stages 30, 31 may be configured to measure the amplitude of the wanted channel and the amplitude of the adjacent channel interferers and supply the results to the controller 36 which alters the resolution of the quantisers by varying the number of quantisation levels and/or the oversampling rate.

FIG. 3 illustrates in greater detail a cross coupled, continuous time, fourth order low pass Sigma-Delta converter suitable for use in the receiver shown in FIG. 1. The illustrated converter has been described and claimed in the Applicant's unpublished PCT Patent Application No. EP99/06786 claiming priority from British Patent Application No. 9821839.9, filed Oct. 8, 1998.

Referring to FIG. 3, quadrature related analogue low IF signals I and Q are applied respectively to input terminals 50, 51. Each input terminal 50, 51 is coupled to a fourth-order, time-continuous, Sigma-Delta converter 52, 54. Each converter 52, 54 comprises an anti-alias continuous time analogue loop filter consisting of four series connected transconductor-capacitor integrators 56, 58, 60, 62 and 57, 59, 61, 63. The second to fourth integrators of each modulator are cross-coupled by gyrators 64, 66, 68. Each stage is set to resonate at a respective frequency in the IF band; the frequency being determined in accordance with the ratio $g_m/C$. The value of C is set by the noise requirements and conductance $g_m$ is set to give the desired centre frequency for that value of C. Cross coupling these stages has the effect of introducing a negative susceptance at each capacitor site whose value is determined by the shift in frequency required and the characteristic admittance of the gyrator. The first stages 56, 57 are not cross-coupled which avoids introducing a dc offset to the outputs of these stages. Outputs of each of the four stages 56, 58, 60, 62 and 57, 59, 61, 63 are combined in respective summation stages 70, 72. Outputs of the stages are applied to respective quantisers Q1 and Q2 in which the analogue signals are over-sampled by n×Fs, where Fs is the symbol rate, to provide digital signals having the required resolution on the outputs 36, 37, respectively. By choosing a high over-sampling ratio, that is, the higher the number of samples over which the average can be made, the better will be the effective resolution of the ADC.

The outputs of the quantisers Q1, Q2 are also fed back, converted into analogue signals in DACs DAC1, DAC2 and combined in summation stages SC1, SC2 with signals on the respective input terminals 50, 51. The feedback loops ensure that, in the frequency band of interest, the average value of the quantisation noise produced by the quantisers Q1, Q2 is as small as possible, to make the averaging process worthwhile.

The bit streams on the outputs 74, 75 of the Sigma-Delta converters are applied to the first decimation stages 38, 39 (FIG. 1) which reduce the sample rate, reduce the very high levels of noise produced by the Sigma Delta converters outside the wanted signal bandwidth and provide the majority of the receiver's channel selectivity. The decimated signal is then de-rotated and decimated further to reduce the bit rate to that required for a GSM signal.

FIG. 4 is a diagram of one of the quantisers Q1 or Q2. In order to be able to vary the resolution of the quantiser in dependence on the size of the wanted signal or the interferers, the quantiser has a plurality of preset levels which can be selected by the controller 36. If a 1 bit resolution is required the quantiser has a single level referenced "0". Other linearly spaced levels referenced 0.25; 0.50; 0.75; 1.0 and −0.25; −0.50; −0.75 and −1.0 can be selected to give improved resolution.

One method of varying the resolution is to pair off the corresponding complementary levels such as 0.25 and −0.25 and to dynamically select more and more pairs as the need for increased resolution rises and vice versa. In FIG. 4, the selection of each of the pairs is controlled by a respective switch B1 to E1 in conjunction with the operation of a multi-position switch 80. For say 2-bit resolution, switch B1 is closed so that when the switch 80 is at position B there are three levels of quantisation 0, 0.25 and −0.25. For the next higher resolution switches B1 and C1 are closed and the switch 80 is at position C and so on until for the highest resolution all the switches B1 to E1 are closed. In practice the quantiser is implemented as a plurality of gates and comparators. Thus when a low resolution is required many gates and comparators are de-energised thus saving current.

Optionally and/or additionally the over-sampling rate of the quantisers Q1, Q2 may be varied. When altering the resolution and/or over-sampling of the quantisers Q1, Q2 comcomitant changes may have to be effected to other parts, for example filters, used in the receiver shown in FIG. 1 or the Sigma-Delta converters shown in FIG. 3.

If desired the receiver shown in FIG. 1 may be adapted to operate the quadrature related stages at zero IF by altering the local oscillator frequency to equal the notional carrier frequency of the signals on the first inputs 18, 19 of the balanced mixers 20, 21.

In a non-illustrated embodiment of the present invention the interference measuring stages 30, 31 (FIG. 1) may be arranged within the Sigma-Delta converter.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of radio receivers and components therefor and which may be used instead of or in addition to features already described herein.

What is claimed is:

1. A receiver comprising at least one analogue-to-digital converter (ADC), means for determining a level of at least one prevailing adjacent channel interference, and means for dynamically adjusting the resolution of the ADC to be no larger than that required to handle the prevailing interference and a desired signal.

2. A receiver comprising means to frequency down convert an input signal to an intermediate signal, digital channel selection filtering means including at least one analogue-to-digital converter (ADC), said ADC comprising an over-sampling quantizer having a plurality of dynamically selectable quantization levels, and means responsive to the characteristics of the input signal for at least matching the number of quantization levels selected to the characteristics of the input signal.

3. A receiver comprising means to frequency down convert an input signal to an intermediate signal, digital channel selection filtering means including at least one analogue-to-digital converter(ADC), said ADC comprising a signal combiner having first and second inputs and an output, the intermediate frequency signal being coupled to the first input, analogue filtering means coupled to said output, an over-sampling quantizer coupled to an output of the analogue filtering means, the over-sampling quantizer having an output which is coupled to digital filtering means which provides an output signal, a digital to analogue converter having an input coupled to the output of the over-sampling quantizer and an output coupled to the second input of the signal combiner which produces the difference between the signals on its first and second inputs as an output, wherein the over-sampling quantizer has a plurality of dynamically selectable quantization levels, and means responsive to the characteristics of the input signal are provided for varying the over-sampling rate and/or matching the number of quantization levels selected to the characteristics of the input signal.

4. The receiver as claimed in claim 1, including filters for measuring characteristics of the desired channel signal and at least the adjacent channel signals and means for selecting at least one of the over-sampling rate and number of quantization levels in response to the measurements made by the filters.

5. The receiver as claimed in claim 1, wherein the ADC is a Sigma-Delta ADC.

6. A method of operating a receiver having at least one analogue to digital converter (ADC), comprising determining a level of at least one prevailing adjacent channel interference and dynamically adjusting the resolution of the ADC to be no larger than that required to handle the prevailing interference and a wanted signal.

7. The method as claimed in claim 6, wherein the ADC includes a quantizer having a plurality of selectable quantization levels and the resolution is adjusted by varying the number of levels selected to match the dynamic range of the prevailing interference.

8. The method as claimed in claim 6, wherein the ADC includes an over-sampling quantiser and the rate of sampling is varied to suit the required resolution.

9. An integrated circuit comprising at least one analogue-to-digital converter (ADC), said ADC comprising an over-sampling quantizer having a plurality of dynamically selectable quantization levels, and means responsive to the characteristics of an input signal to the ADC for at least matching the number of quantization levels selected to the characteristics of the input signal.

10. The integrated circuit as claimed in claim 9, wherein the ADC is a Sigma-Delta ADC.

* * * * *